United States Patent
Millican et al.

(10) Patent No.: US 9,390,292 B2
(45) Date of Patent: Jul. 12, 2016

(54) ENCRYPTED DIGITAL CIRCUIT DESCRIPTION ALLOWING CIRCUIT SIMULATION

(71) Applicant: Wisconsin Alumni Research Foundation, Madison, WI (US)

(72) Inventors: Spencer Millican, Plover, WI (US); Parameswaran Ramanathan, Madison, WI (US); Kewal Saluja, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 165 days.

(21) Appl. No.: 14/143,300

(22) Filed: Dec. 30, 2013

(65) Prior Publication Data

US 2015/0188661 A1   Jul. 2, 2015

(51) Int. Cl.
*G06F 21/44* (2013.01)
*G06F 21/76* (2013.01)
*G06F 17/50* (2006.01)
*G06F 21/14* (2013.01)
*G06Q 10/10* (2012.01)
*H04L 9/06* (2006.01)

(52) U.S. Cl.
CPC ............ *G06F 21/76* (2013.01); *G06F 17/5009* (2013.01); *G06F 21/14* (2013.01); *G06Q 10/10* (2013.01); *H04L 9/0618* (2013.01)

(58) Field of Classification Search
CPC ... G06F 21/75; H04L 2209/12; H04L 9/0618; G06Q 10/10
USPC .......................................................... 380/287
See application file for complete search history.

(56) References Cited

U.S. PATENT DOCUMENTS

| | | | |
|---|---|---|---|
| 7,131,091 B1 * | 10/2006 | Ganesan | G06F 17/5022 716/108 |
| 7,165,229 B1 | 1/2007 | Gathoo et al. | |
| 7,574,679 B1 | 8/2009 | Gathoo et al. | |
| 7,685,418 B1 | 3/2010 | Knight | |
| 7,721,090 B1 | 5/2010 | Deepak et al. | |
| 8,010,782 B2 * | 8/2011 | Kerschbaum | G06Q 10/10 380/278 |
| 8,417,965 B1 | 4/2013 | Sundararajan et al. | |
| 8,824,672 B1 * | 9/2014 | Gomathisankaran | G06F 11/30 380/29 |
| 2003/0198343 A1 * | 10/2003 | Morioka | H04L 9/0618 380/37 |
| 2006/0114135 A1 * | 6/2006 | Whitaker | G06F 17/5045 341/51 |
| 2007/0116283 A1 * | 5/2007 | Tuyls | H04L 9/008 380/255 |
| 2013/0346928 A1 | 12/2013 | Li et al. | |
| 2014/0093077 A1 * | 4/2014 | Jawurek | H04L 63/123 380/268 |

* cited by examiner

*Primary Examiner* — Hadi Armouche
*Assistant Examiner* — Bryan Wright
(74) *Attorney, Agent, or Firm* — Boyle Fredrickson, S.C.

(57) ABSTRACT

A system for creating protected functional descriptions of integrated circuits provides an encrypted functional description that allows the integrated circuit to be simulated with respect to producing outputs for given sets of inputs without identification of the constituent components of the integrated circuit such as the logical gates making up the integrated circuit. The encrypted functional description may include encrypted truth-tables describing the generic gates of the integrated circuit, the encrypted truth-tables securing the function of each logical gate by including multiple redundant table entries mapped to alias values of Boolean logical states and erroneous table entries.

18 Claims, 4 Drawing Sheets

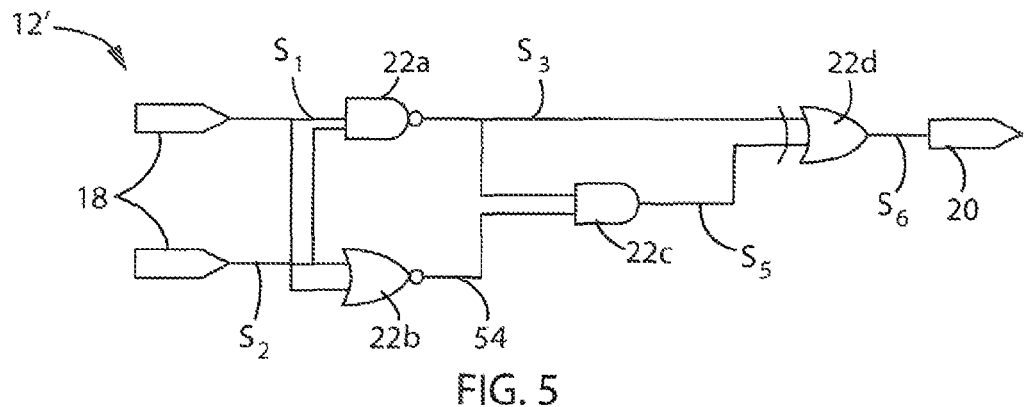
FIG. 5
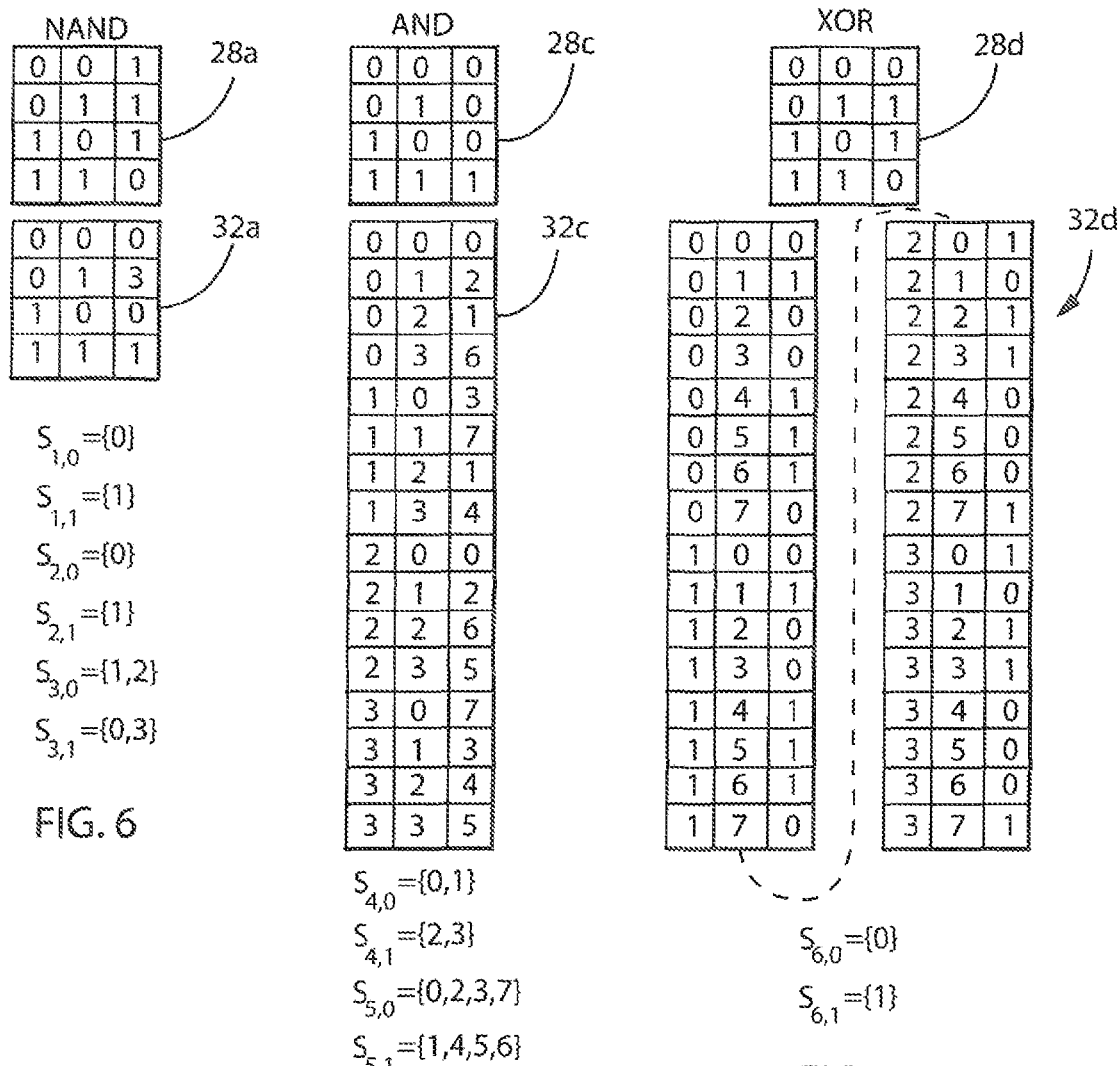
FIG. 6
FIG. 7
FIG. 8

ENCRYPTED DIGITAL CIRCUIT DESCRIPTION ALLOWING CIRCUIT SIMULATION

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to integrated circuits and in particular to an electronic description of an integrated circuit that is encrypted to prevent the details of the circuit from being revealed while still allowing simulation of the integrated circuit, for example, for logic and fault simulation.

Complex integrated circuits, such as "system on chip" (SOC) designs can be constructed from circuit "building blocks" developed by different companies. The building blocks are assembled by combining electronic files describing each building block to produce the necessary integrated circuit masks needed to produce the ultimate integrated circuit.

These building blocks are often referred to as intellectual property (IP) cores, reflecting the fact that it is the underlying design (the intellectual property) that is sold by the designer as opposed to an actual integrated circuit. The ability to license IP cores provides substantial efficiency in the design of complex circuit elements by allowing the costs of developing an IP core to be shared among multiple manufacturers.

The abstract IP core is captured in an electronically readable circuit-level schematic describing each component, for example logic gates, and their interconnection, together with a functional description of the inputs and outputs to the IP core (the functional specification). While the sale of an IP core may include this entire functional specification (a so-called "soft" core), it is also possible to sell an electronic description of an IP core that provides only layout information and the functional description of the inputs and outputs without the circuit level schematic. This so-called "hard" core allows fabrication of the IP core but does not reveal information about the internal circuit configuration or components, preventing ready copying or modification of the IP core.

Normally a hard-core license for an IP core will be cheaper than a soft-core license because the hard-core license, by hiding the circuit design, reduces the risk that the purchaser will be able to compete with or develop commercial alternatives to the IP core or that the intellectual property of the IP core will be revealed. Nevertheless, the less-expensive hard-core license has significant drawbacks. Because the details of the underlying circuit are hidden, it is not possible to simulate the IP core alone or in combination with the other building block circuits. The ability to simulate operation of the IP core allows better integration with other circuit elements, for example, by revealing operating limitations such as signal propagation delays that need to be accommodated. Simulation is also important to identify how component faults will affect the IP core. Such fault simulation allows the end user to construct more efficient "built-in self test" (BIST) logic that can be used to test the operation of the IP core during manufacture. Generally, BIST logic identifies bit patterns or vectors that are used to detect faults in a logic circuit.

The practical ability to select only between a hard-core or soft-core licensing model substantially limits the market for IP cores in many important applications where IP core simulation is required, but purchasing a soft-core license is too costly

SUMMARY OF THE INVENTION

The present invention provides an encrypted functional description of the IP core that can be used for simulation but which still obscures the design and operation of the underlying circuit. In this way, the present invention makes it possible to license IP cores in a way that provides the intellectual property protection associated with hard-core licensing while allowing the simulation capabilities associated with soft core licensing.

Generally, the invention provides an electronic functional description of the underlying IP core where nodes or gates of the circuit are replaced with generic placeholder nodes. These generic placeholder nodes are given encrypted truth-tables that permit simulation but effectively disguise the function of the placeholder node. For example, the encrypted truth-table may arbitrarily expand the underlying truth-table using multiple alias values that hide the logic of the node. In one embodiment, the encrypted truth-table may include erroneous entries at truth-table states which do not occur in practice. The effect is to render the function of the node symbols practically unintelligible.

Specifically then, at least one embodiment of the invention provides an encryptor for digital circuit description files that may receive electronically readable input data defining a digital circuit having interconnected nodes implementing standard Boolean functions. The input data describes the interconnection of the nodes and the functions of the nodes. The encryptor creates encrypted output data describing the interconnection of the nodes but using encrypted functions of the nodes that provide accurate computation of node outputs from node inputs but which are different from the standard Boolean functions of the nodes. The encrypted output data is output in a form adapted to permit simulation of the digital circuit.

It is thus a feature of at least one embodiment of the invention to prevent ready determination of the functions of the nodes of the integrated circuit so as to preserve the confidentiality of that design while allowing the end user to perform simulations of the circuitry for the purpose of integration or fault simulation.

The standard Boolean logic functions may include the Boolean AND function, Boolean OR function, Boolean NAND function, Boolean NOR function, or the Boolean EXCLUSIVE OR (XOR) function.

It is thus a feature of at least one embodiment of the invention to provide a system that works with a large variety of basic circuit building blocks used in integrated circuits.

The encrypted function of a given node may have a different range and/or different domain than the standard Boolean functions of the given node.

It is thus a feature of at least one embodiment of the invention to obfuscate the node functions by expanding them to larger domains or ranges that may nevertheless map to Boolean values according to an undisclosed mapping.

The standard Boolean functions and the encrypted functions of each node may be expressible as truth-tables and the number of rows of the truth-table of the encrypted functions may be greater than the number of rows of the truth-table of corresponding standard Boolean functions for at least one given node.

It is thus a feature of at least one embodiment of the invention to obscure the underlying logical function of the encrypted truth-table by expanding the number of table entries.

There may be a many-to-one mapping between arguments of the encrypted function and arguments of the standard Boolean function of a given node and a many-to-one mapping between values of the encrypted function and values of the standard Boolean function of the given node, and the encrypted functions for the given node may include a subset of arguments and values that differ from the arguments and values of the standard Boolean function of the given node to which the arguments and values of the encrypted functions map.

It is thus a feature of at least one embodiment of the invention to include arguments/value pairs in the encrypted function that are inconsistent with the underlying standard Boolean function, and thus further obfuscate the underlying Boolean function.

At least some different nodes having a same standard Boolean function may have different encrypted functions.

It is thus a feature of at least one embodiment of the invention to change the encryption for each node to further disguise the underlying function of the node.

Similarly, at least some different nodes having a same standard Boolean function may have encrypted functions with different domains or ranges.

It is thus a feature of at least one embodiment of the invention to change the encryption on a node-by-node basis by altering the mapping process of underlying Boolean values to larger domains or ranges.

The electronically readable input data may describe functions of the nodes through selection of node symbols representing the standard Boolean functions and the encrypted output data may replace the node symbols with generic placeholders not representing a Boolean function.

It is thus a feature of at least one embodiment of the invention to permit the development of a visual representation of the digital circuit that may be useful to the end user that shows the general topology of the circuit, for example, to approximate propagation delays without providing a detailed understanding of the circuit operation.

The nodes symbols may provide independently represented inputs corresponding to function arguments and outputs corresponding to function values and the corresponding generic placeholders provide the same independently represented inputs and outputs.

It is thus a feature of at least one embodiment of the invention to permit a standard schematic-type representation without revealing the circuit design.

The standard Boolean functions and the encrypted functions of each node may be expressed as truth-tables and wherein the truth-table of the encrypted function may map binary values of the truth-table of the standard Boolean function to different values from two multivalued disjoint sets each associated with a different Boolean value.

It is thus a feature of at least one embodiment of the invention to provide a simple method of encoding by randomly selecting elements from among pre-established disjoint argument and/or value sets.

The encrypted function for nodes that receive inputs from a source external to the digital circuit may provide arguments that are only Boolean values. Similarly, the encrypted function for nodes that provide outputs to a destination external to the digital circuit may provide values that are only Boolean values.

It is thus a feature of at least one embodiment of the invention to permit the encrypted output data to be used in a simulation receiving and accepting standard binary values without a modification of the standard binary values at the interface between the encrypted digital circuit description and other circuitry.

The encrypted functions for each node may be used in a simulation without decryption.

It is thus a feature of at least one embodiment of the invention to provide extremely rapid simulation that does not require complex decryption steps.

These particular objects and advantages may apply to only some embodiments falling within the claims and thus do not define the scope of the invention.

BRIEF DESCRIPTION OF THE DRAWINGS

FIG. 5 is a schematic representation of the integrated circuit having stems identified with particular truth-table expansion sets;

FIG. 6 is a resulting encrypted truth-table produced for an input node of FIG. 2;

FIG. 7 is a resulting encrypted truth-table produced for an internal node of FIG. 2;

FIG. 8 is a resulting encrypted truth-table for an output node of FIG. 2;

DETAILED DESCRIPTION OF THE PREFERRED EMBODIMENT

Figure 1:
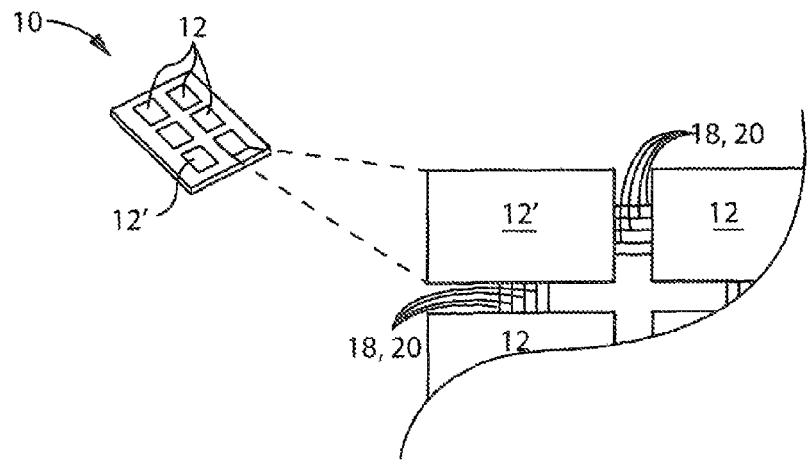
FIG. 1 is a simplified perspective view of a complex integrated circuit constructed of multiple components including at least one IP core and showing the interconnection between the IP core and other circuit elements.
Figure 9:
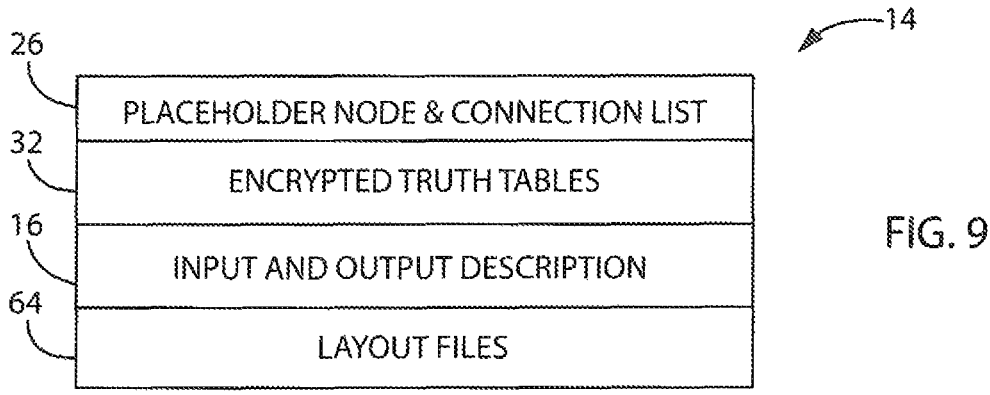
FIG. 9 is a simplified representation of an encrypted functional description per the present invention which may serve as the basis for an IP core license.

Referring now to FIGS. 1 and 9, an integrated circuit 10, such as a system on a chip (SOC), may provide for multiple interconnected circuit blocks, herein termed "cores" 12 including at least one IP core 12' that may be licensed under terms that reveal only an encrypted functional description 14 of the IP core 12' per the present invention. Generally the encrypted functional description 14 will be an electronic data file providing information suitable for manufacture of the IP core 12' as an integrated circuit.

The encrypted functional description 14 may include an unencrypted I/O description 16 providing functional information about the core inputs 18 and outputs 20 that may be used to connect the IP core 12' to other cores 12 or glue logic of the integrated circuit 10. The unencrypted I/O description 16 may, for example, identify particular inputs and outputs according to functions such as particular data lines or clock signals related to a disclosed function of the IP core 12' as well as timing diagrams or the like in the manner of the description of the pins of integrated circuit. The unencrypted I/O description 16 does not reveal the internal construction or layout of the core 12'.

Figure 2:
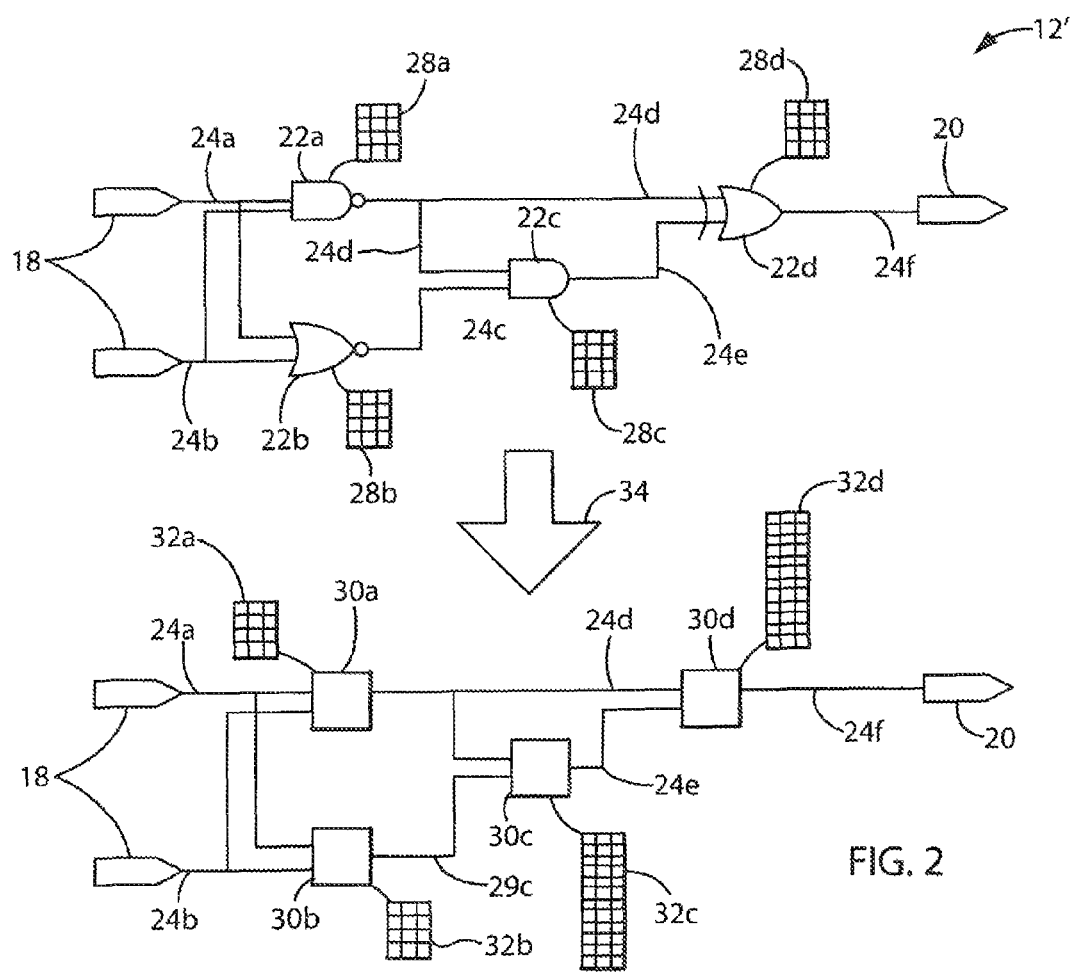
FIG. 2 is a schematic representation of the transformation of a complete functional specification of gates of an IP core into an encrypted functional description of those gates per the present invention.

Referring now to FIG. 2, the IP core 12' will generally be constructed of multiple circuit elements, termed nodes 22, typically including but not limited to logic gates, such as Boolean AND gates, Boolean OR gates, Boolean NAND gates, Boolean NOR gates, and Boolean EXCLUSIVE OR (XOR) gates. Each of the nodes 22 may be interconnected by conductors, herein termed stems 24. Generally the stems 24 represent electrical signal communication between the nodes 22.

Input stems 24a and 24b, as depicted, connect with the inputs 18 of the IP core 12' and output stem 24f, as depicted, connects with output 20. In this example, input stems 24a and 24b each connect to one input of a dual input AND gate of node 22a and a dual input NOR gate of node 22b. The output of the dual input AND gate of node 22a connects to stem 24d and to one input of a dual input EXCLUSIVE OR gate of node 22d. Stem 24d also connects to one input of a dual input AND gate of node 22c. The output of the dual input NOR gate of node 22b connects to stem 24c which connects to the remaining input of the dual input AND gate of node 22c. The output of the dual input AND gate of node 22c connects to stem 24e connecting to the remaining input of the dual input EXCLUSIVE OR gate of node 22d. The output of the EXCLUSIVE OR gate of node 22d connects to output stem 24f.

As will be referred to in the discussion below, with this circuit configuration, for any possible logical combination of input values on inputs 18, the dual input AND gate of node 22c will never have an input stage where there is a logical value of zero on stem 24d and a logical value of one on stem 24c.

Figure 11:
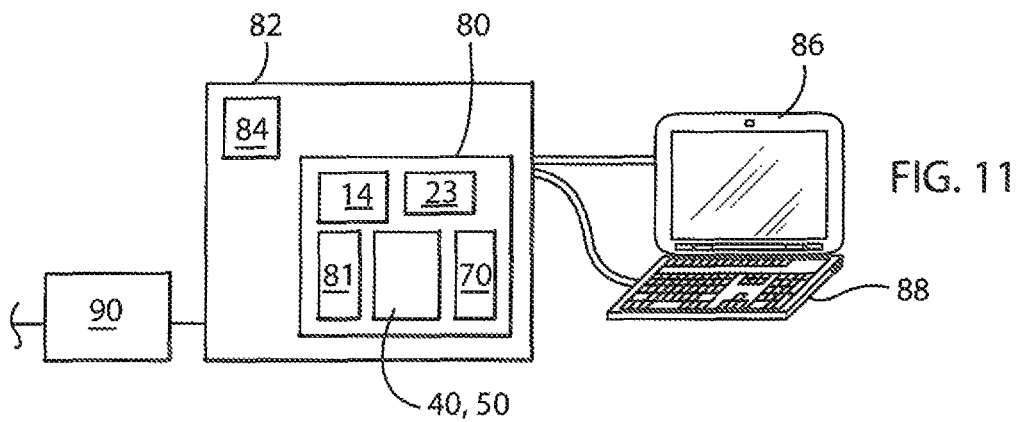
FIG. 11 is a simplified diagram on an electronic computer on which the present invention may operate.

The information identifying each of the nodes 22, stem 24 and their interconnection are generally captured in an unencrypted functional specification 23 (shown in FIG. 11 being a computer readable data file or the like, as is understood in the art, such as may be received in non-transient memory of a computer. The unencrypted functional specification 23 fully describes the integrated circuit 10 including the interconnections provided by the stems 24 among the nodes 22, the inputs 18 and outputs 20. The unencrypted functional specification 23 may also include the unencrypted I/O description 16 and sufficient information for manufacture of the underlying integrated circuit.

In this unencrypted functional specification 23, the functions of the nodes 22 may be represented by standard gate symbols (as shown in FIG. 2) used to depict the nodes 22 and reflect an underlying node function, for example, as can be expressed in a logical truth-table 28 associated with each node 22. The unencrypted functional specification 23 may explicitly provide such a functional description for each node 22 or may simply identify a rule serving the equivalent purpose identified to the particular gate symbol. The standard gate symbols may form the basis of a human readable display providing a schematic representation of the integrated circuit 10 as is understood in the art.

As is understood in the art, a truth-table 28 may be logically represented as a set of input columns each associated with a different input to the node 22 where the input columns express all possible combinations of inputs in different truth-table rows. An output column provides an output in each row that would be associated with the particular combination of inputs for that row. In this respect, a truth-table 28 provides a representation of a function where the inputs are function arguments and the outputs are function values. With a normal Boolean logical function, the domain of the arguments and the range of the values are both limited to the two Boolean states of zero and one.

The unencrypted functional specification 23 may be prepared by computer-aided design tools as will be generally understood to those of skill in this art.

Referring to FIGS. 2 and 9, the present invention may convert the unencrypted functional specification 23 into the encrypted functional description 14 through an encryption process 34. The encrypted functional description 14 provides a node and connection list 26 that fully captures the information of the unencrypted functional specification 23 with respect to listing the different nodes 22 and describing the interconnections by the stems 24 between the nodes 22, inputs 18 and outputs 20 while omitting any the functional description of the truth-tables 28. This omission of the truth-tables 28 is visually represented by an elimination of the symbols of the nodes 22 and replacing them with generic placeholder nodes 30 in the form of boxes as shown. These generic placeholder nodes 30 form part of a display presented to a user receiving the encrypted functional description 14 essentially reproducing a schematic of the integrated circuit 10 absent only the functional description of the nodes 30.

This node and connection list 26 is supplemented with encrypted truth-tables 32 which replace the truth-tables 28. As will be explained below, the replacing of the nodes 22 with generic placeholder nodes 30 and the replacing of the truth-tables 28 with encrypted truth-tables 32 will permit the encrypted functional description 14 to be used for circuit simulation but will prevent ready reverse engineering of the design of the IP core 12'.

Figure 3:
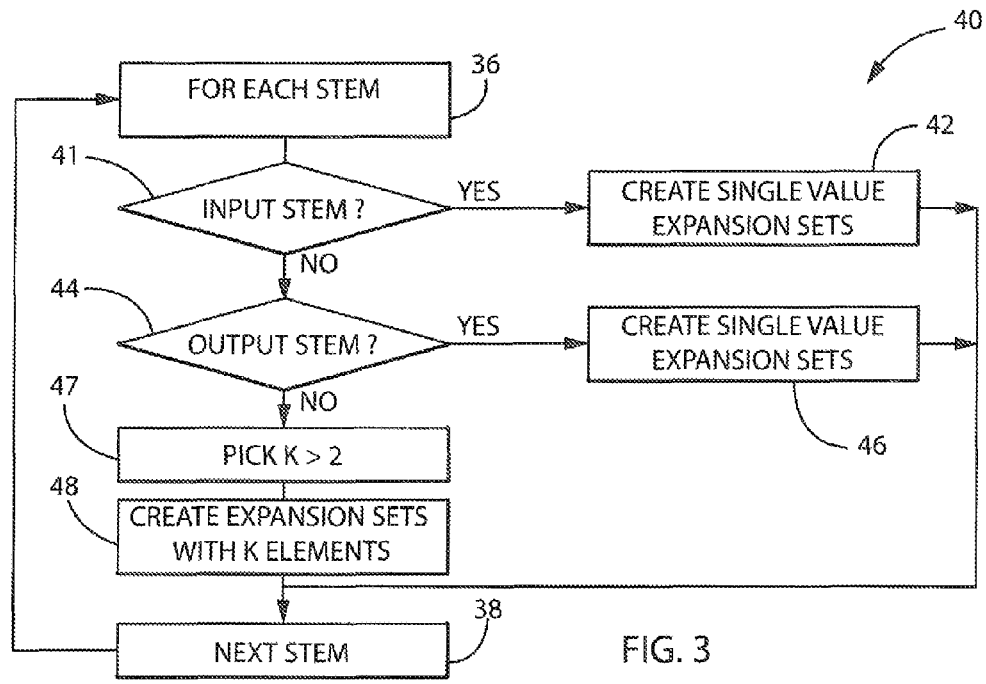
FIG. 3 is a flowchart of the steps of the present invention in developing truth-table expansion sets for each stem of FIG. 2.

Referring now to FIGS. 2 and 3, the process of producing the encrypted truth-tables 32 begins by developing truth-table expansion sets for each of the stems 24 that may be performed by a computer program 40 receiving the unencrypted functional specification 23. Computer program 40 sequentially processes each stem 24 according to a loop provided by process blocks 36 and 38. In each loop iteration, a truth-table expansion set is generated for the stem 24 which provides two non-empty and disjoint subsets of values, with each subset associated with one of the two Boolean logical values. For example, there will be one expansion subset for the Boolean logical value zero (represented by $S_{i,0}$ for set elements i) and one expansion subset for Boolean logical values of one (represented by $S_{i,1}$ for set elements i).

One simple way of constructing these two truth-table expansion sets is to select a value K greater than two and then randomly divide the values from 0 to K between the two sets so that neither set is empty. So, for example, if the value of K=7 is selected, two expansion sets can be constructed as follows:

$$S_{i,0} = \{1,4,5,6\} \quad (1)$$

$$S_{i,1} = \{0,2,3,7\} \quad (2)$$

For the stems 24 that are connected to input 18 or outputs 20, the corresponding expansion sets have only a single value equal to the Boolean logical value as follows:

$$S_{i,0} = \{0\} \quad (3)$$

$$S_{i,1} = \{1\} \quad (4)$$

This above described process is implemented within the loop of program 40 by first examining each stem at decision block 41 to determine whether the given stem 24 is an input stem attached to an input 18. If so, the expansion set for those stems (for example stems 24a and 24b) is single valued and equal to the Boolean value to be expressed by that expansion set as described above with respect to equations (3) and (4) and as indicated by process block 42 of FIG. 3. Generally the expansion sets provide alias values for the two logical Boolean states that that will obscure the functions of the nodes 22 when expressed as truth-tables.

If the given stem 24 is not an input stem, then at decision block 44 it is examined to determine if it is an output stem attached to output 20. If so, the expansion set for that stem (for example stem 24f) is also set to a single value equal to the Boolean value as described above with respect to equations (3) and (4) and as indicated by process block 46 of FIG. 3.

If this given stem 24 is neither input nor output stem 24, then at process block 47, a value of K>2 is selected and at process block 48 multivalued expansion sets are developed as described above and shown by way of example in equations (1) and (2). Note that the value of K may be fixed for all stems 24 or may vary amongst stems according to some predetermined pattern or rule (for example randomly within a predetermined range).

Figure 4:
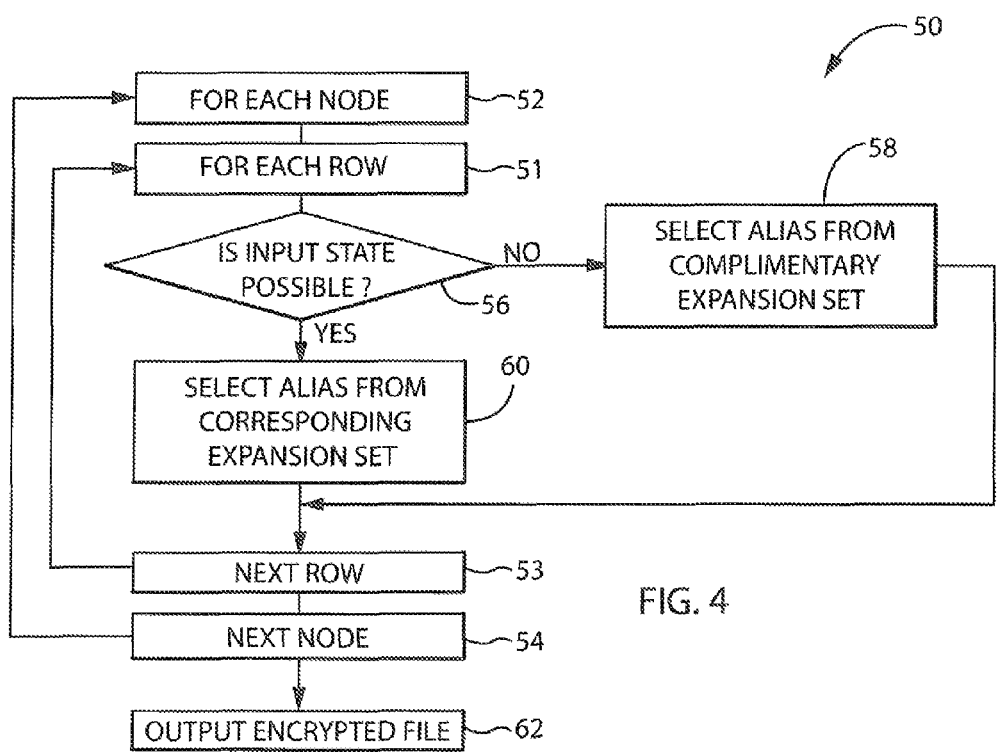
FIG. 4 is a flowchart of the steps of the present invention in developing encrypted truth-tables for each of the nodes of FIG. 2.

Referring now to FIGS. 2 and 4, once the truth-table expansion sets have been developed as described above, the truth-tables 28 are converted to encrypted truth-tables 32 according to a program 50 looping through each node 22 of the unencrypted functional specification 23 according to process blocks 52 and 54 and looping through each row entry of each truth-table for each node according to process blocks 51 and 53. Generally the encrypted truth-table 32 will begin with a row associated with each possible combination of its input values. Generally the number of rows will be larger than the number of rows in the truth-table 28 and, as will be discussed in greater detail below, will depend on the number of inputs of the node 22 and the number of possible state values that can be associated with each input, in turn, being a function of the truth-table expansion sets for the stems 24 received at the inputs of the node 22.

For each node 22 and each row of the truth-table 32, a determination is made at decision block 56 as to whether the particular combination of input values for a row of the truth-table 32 is possible given the construction of the integrated circuit 10. As noted above, for example, for node 22c the input combination of (0, 1) (expressed in the form of underlying Boolean values) for stems 24a and 24b will never occur and accordingly for any possible input values. Thus if stem 24a has a value of any of the elements of $S_{i,0}$ and stem 24b has a value of any of the elements of $S_{i,1}$ that particular row of the truth-table 32 will never be invoked. In such cases, the program 50 proceeds to process block 58 and the output of that row of the encrypted truth-table 32 is randomly selected from the expansion set associated with the complement of the actual Boolean output. That is, if the corresponding output of truth-table 28 is zero, and the output for the encrypted truth-table 32 is randomly selected from the expansion set $S_{i,1}$ and if the output for the truth-table 28 is one, the output for the encrypted truth-table 32 is selected from the expansion set $S_{i,0}$. The net effect is to create an entry for the encrypted truth-table 32 that is contrary to the actual logic of the associated node 22 and which would be in error if that row were relied upon in simulation.

The identification of these impossible input states may be performed through a variety of techniques including, for example, techniques described in P. Goel, "An Implicit Enumeration Algorithm to Generate Tests for Combinational Logic Circuits," IEEE Transactions on Computers, VolumeC-30, pages 215-222, March, 1981.

If at decision block 56, the Boolean input combination is possible and that row of the encrypted truth-table 32 might be invoked, then the program 50 proceeds to process block 60 and the output of that row of the encrypted truth-table 32 is randomly selected from the expansion set associated with the actual Boolean output for a corresponding row from truth-table 28. That is, if the corresponding output of truth-table 28 is zero, and output for the encrypted truth-table 32 is randomly selected from the expansion set $S_{i,0}$ and if the output for the truth-table 28 is one, the output for the encrypted truth-table 32 is selected from the expansion set $S_{i,1}$.

Once each of the nodes has been processed to create an encrypted truth-table 32, the program proceeds to process block 62 and the encrypted functional description 14 shown in FIG. 8 maybe output.

Example I

Referring now to FIGS. 5 and 6, a truth-table 28a for dual input NAND gate of node 22a may be converted to an encrypted truth-table 32a. As depicted, the first two columns of truth-table 28a represent inputs to the node 22a and the third column represents the output of the node 22a in a first step, and expansion sets $S_{1,0}$, $S_{1,1}$, $S_{2,0}$, $S_{2,1}$ are developed for stems 24a and 24b, respectively. Because input stems 24a and 24b are input stems, the truth-table expansion sets are developed according to process block 42 described above, being single valued expansion sets per equations (3) and (4) described above corresponding to the underlying Boolean logic values received by the node 22a. In addition, expansion set $S_{3,0}$, $S_{3,1}$, for output stem 24d, in this example, is based on a K value of 3 as depicted in FIG. 6. The output of the encrypted truth-table 32a is thus randomly selected from the appropriate truth-table expansion set $S_{3,0}$, $S_{3,1}$ guided by the corresponding output of truth-table 28a. For example, in the second row of the encrypted truth-table 32a the output value of 3 is obtained from truth-table expansion set $S_{3,1}$ as guided by the corresponding 1 output in truth-table 28a for this row.

Example II

Referring now to FIGS. 5 and 7, for an internal node 22, for example the AND gate of node 22c, the encrypted truth-table 32c will be substantially larger than the corresponding truth-table 28c, so that the inputs of the encrypted truth-table 32c can represent all of the permutations of the values of the corresponding expansion sets $S_{3,0}$, $S_{3,1}$ and $S_{4,0}$, $S_{4,1}$ associated with stems 24d and 24c, respectively, received by the internal node 22c. These expansion sets based on the value of K=3 requires an encrypted truth-table having sixteen rows according to the formula:

$$\Pi_{i \in I_j}(K_i+1)$$

where $I_j$ is the set of stems received by the node of the encrypted truth-table 32.

As discussed above, each of the rows of the encrypted truth-table 32c may be populated with the permutations of input values corresponding to expansion sets $S_{3,0}$, $S_{3,1}$ and $S_{4,0}$, $S_{4,1}$ and the outputs of the encrypted truth-table 32c generated by determining the underlying Boolean logical states associated with those inputs and by reference to the truth-table 28c determining a corresponding logical Boolean output. This logical Boolean output is then used to identify one of the truth-table expansion sets $S_{5,0}$, or $S_{5,1}$ corresponding to the logical Boolean output value. A randomly selected element from the identified truth-table expansion set then provides the output value in the encrypted truth-table 32c.

Thus, for example, the third row of truth-table 32c has inputs which both correspond to underlying logical Boolean values of 1 (the first input value of zero corresponds to truth-table expansion set $S_{3,1}$ and the second input value 2 corresponds to truth-table expansion set $S_{4,1}$). The corresponding Boolean output derived from truth-table 28c would then be 1 and the output value therefore selected from truth-table expansion set $S_{5,1}$, in this case 1.

One exception to this process is found in the eighth row of truth-table 32c having input values of 1 and 3 (representing underlying Boolean values of zero and one received from stems 24d and 24c). Normally the output of an AND gate of node 22c having a zero and one input would be zero but here the output is selected from set $S_{5,1}$ (e.g. the set element 4) technically providing an erroneous entry to the encrypted truth-table 32c. This deviation from the correct logic of the node 22c is acceptable because this row of the truth-table 32c will never be invoked. Yet the error complicates deducing the underlying logical function of node 22c from truth-table 32c.

Example III

Referring now to FIGS. 5 and 8, the encrypted truth-table 32d for node 22d (an XOR gate) is constructed similarly to those described above except that the output values are all selected from single valued subsets $S_{6,0}$, or $S_{6,1}$ to directly reflect the underlying Boolean output of the truth-table 28d. This ensures that the simulation using the encrypted truth-tables 32 provides outputs from the core 12' that are identical to that provided by the actual core 12'.

Looking at the second row of the encrypted truth-table 32d, the output is a logical Boolean zero reflecting the underlying Boolean values of the input of 1 per element 0 of truth-table expansion set $S_{3,1}$ and one per element 1 of truth-table expansion set $S_{5,1}$.

Referring to FIG. 9, the functional specification may also include, for example, a layout 64 of the integrated circuit 10 that may be used for fabrication of the integrated circuit, something that is not possible to construct from the information of the node and connection list 26 and encrypted truth-tables 32 and functional descriptions of the inputs and outputs in the unencrypted I/O description 16.

Figure 10:
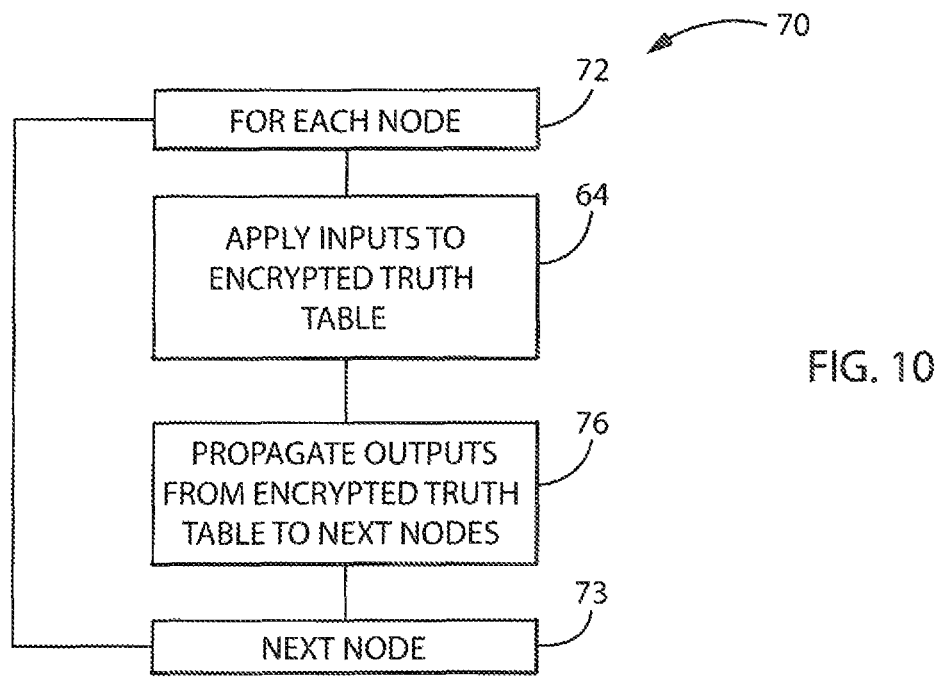
FIG. 10 is a flowchart of the steps of simulating the circuit of FIG. 2 using the encrypted functional description of FIG. 8.

Referring now to FIG. 10, the encrypted functional description 14 may nevertheless be used, without decryption, to simulate operation of the IP core 12'. Such a simulation program 70 may move through each placeholder node 30 in the node and connection list 26 per the loop as indicated by process blocks 72 and 73. In each loop iteration, inputs are identified for the given placeholder nodes 30 either from inputs 18 or from previous placeholder nodes 30 as indicated by process block 74. These inputs are applied to the encrypted truth-table 32 to provide encrypted output as indicated by process block 76 which may be propagated to additional placeholder nodes 30 or to the outputs 20 in subsequent iterations. Ultimately, correctly simulated logical Boolean outputs will be generated from arbitrary logical Boolean inputs.

These steps of process block 72, 74, 76, and 73, maybe incorporated into a system fault detection program, for example, for identifying particular input values which will distinguish the existence of faults internal to the IP core 12' to develop vectors for a built-in self test circuit according to techniques understood in the art with conventional simulation.

Referring now to FIG. 11 programs 40, 50 and 70 may be stored in non-transient computer-readable memory 80 together with the necessary data structures 81 of the expansion sets and truth-tables and the encrypted functional description 14. The computer readable memory 80 may be part of an electronic computer 82 including one or more processors 84 communicating with the memory 80 to execute the programs 40, 50, and 70. The computer 82 may communicate with interface devices including a graphic display screen 86 and keyboard 88 to allow entry of user commands in order to perform the steps of encrypting a functional specification described in this application and to provide displays as mentioned above. An external data communication device 90, such as a removable disk drive or network adapter, may be used to communicate data to and from the computer including the original functional specification and the encrypted functional description 14.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. An encryptor for digital circuit description files comprising:
   an electronic computer executing a program stored in non-transient medium to:
   (a) receive electronically readable input data defining a digital circuit having multiple interconnected nodes implementing standard Boolean functions, the input data describing the interconnection of the nodes and the functions of the nodes, the function of the nodes described by an unencrypted truth table having entries that link input values to outputs values from the nodes according to the functions of the nodes;

(b) create encrypted output data describing interconnection of the nodes and encrypting the function of the nodes as encrypted truth tables permitting computation of node outputs from node inputs according to the function of the nodes where the encrypted truth tables are different from corresponding unencrypted truth tables by having at least one row in the encrypted truth table whose pattern of input values and output values is not in the corresponding unencrypted truth table; and (c) output the encrypted output data in a form adapted to permit a simulation of the digital circuit using the encrypted truth tables without decryption to receive inputs and provide outputs for the nodes: the simulation receiving unencrypted simulation inputs to provide simulation outputs identical to output of the digital circuit receiving the unencrypted simulation inputs.

2. The encryptor of claim 1 wherein the unencrypted truth tables describe functions selected from the group consisting of: Boolean AND function, Boolean OR function, Boolean NAND function, Boolean NOR function, and Boolean XOR function.

3. The encryptor of claim 1 wherein the encrypted truth table of a given node has at least one of a different range and different domain than the function of the given node.

4. The encryptor of claim 3 wherein a number of rows of the encrypted truth-table are greater than the number of rows of the corresponding unencrypted truth-table for at least one given node.

5. The encryptor of claim 3 wherein an encrypted truth table is prepared by changing the input values or output values of the unencrypted truth table to different values according to expansion sets mapping values of the unencrypted truth table to at least two different values in the encrypted truth table.

6. The encryptor of claim 3 wherein the encrypted truth table of the encrypted function includes some entries that are identical to entries of the corresponding unencrypted truth table and entries that are not identical to entries of the corresponding unencrypted truth table of the at least one node.

7. The encryptor of claim 1 wherein the encrypted truth table includes erroneous entries that link input values to output values counter to the function of the node.

8. The encryptor of claim 1 wherein at least some different nodes having a same standard Boolean function have different encrypted functions.

9. The encryptor of claim 8 wherein at least some different nodes having a same function have encrypted functions with different domains or ranges.

10. The encryptor of claim 1 wherein the electronically readable input data describes functions of the nodes through selection of node symbols representing Boolean functions and wherein the encrypted output data replaces the node symbols with generic placeholders not representing a Boolean function.

11. The encryptor of claim 10 wherein the node symbols provide independently represented inputs corresponding to function arguments and outputs corresponding to function values and the corresponding generic placeholders provide the same independently represented inputs and outputs.

12. The encryptor of claim 1 wherein the encrypted truth-table converts binary values of an entry of the corresponding unencrypted truth-table to multiple entries of the encrypted truth table including non-binary values.

13. The encryptor of claim 1 wherein the encrypted function for nodes that receive inputs from a source external to the digital circuit provide arguments that are only Boolean values.

14. The encryptor of claim 1 wherein the encrypted function for nodes that provide outputs to a destination external to the digital circuit provide values that are only Boolean values.

15. An encryption system for digital circuit description files comprising:
at least one electronic computer executing a program stored in non-transient medium to:

(a) receive electronically readable input data defining a digital circuit having interconnected nodes implementing standard Boolean functions, the input data describing interconnection of the nodes and the functions of the nodes, the function of the nodes described by an unencrypted truth table having entries that link input values to outputs values from the nodes according to the functions of the nodes;

(b) create encrypted output data describing the interconnection of the nodes and encrypting the function of the nodes as encrypted truth tables permitting computation of node outputs from node inputs according to the function of the nodes where the encrypted truth tables are different from corresponding unencrypted truth tables by having at least one row in the encrypted truth table whose pattern of input values and output values is not in the corresponding unencrypted truth table; and (c) simulating operation of the digital circuit using the encrypted output data by propagating input signals to the nodes according to the described interconnection of the nodes and using the encrypted functions without decryption for each node to generate outputs for the node from inputs to the node according to the described interconnections of the nodes, the simulation receiving unencrypted simulation inputs to provide simulation outputs identical to output of the digital circuit receiving the unencrypted simulation inputs.

16. A method of encrypting digital circuit description files comprising the steps of:

(a) receiving electronically readable input data defining a digital circuit having interconnected nodes implementing Boolean functions, the input data describing the interconnection of the nodes and the functions of the nodes, the function of the nodes described by an unencrypted truth table having entries that link input values to outputs values from the nodes according to the functions of the nodes;

(b) creating encrypted output data describing the interconnection of the nodes and encrypting the function of the nodes as encrypted truth tables permitting computation of node outputs from node inputs according to the function of the nodes where the encrypted truth tables are different from corresponding unencrypted truth tables by having at least one row in the encrypted truth table whose pattern of input values and output values is not in the corresponding unencrypted truth table (c) outputting the encrypted output data in a form adapted to permit simulation of the digital circuit using unencrypted inputs to the simulation and outputting unencrypted outputs from the simulation; and (d) simulating operation of the digital circuit using the encrypted output data by propagating input signals to the nodes according to the described interconnection of the nodes and using the encrypted functions without decryption for each node to generate outputs for the node from inputs to the node according to the described interconnections of the nodes, the simulation receiving unencrypted simulation inputs to provide simulation outputs identical to output of the digital circuit receiving the unencrypted simulation inputs.

17. The method of claim 16 wherein the encrypted truth table of the encrypted function of a given node has at least one of a different range and different domain than the unencrypted truth table of the given node.

18. The method of claim 17 wherein an encrypted truth table is prepared by changing the input values or output values of the unencrypted truth table to different values according to expansion sets mapping values of the unencrypted truth table any of multiple different values in the encrypted truth table.

* * * * *